(12) United States Patent
Latapie et al.

(10) Patent No.: US 11,715,304 B2
(45) Date of Patent: Aug. 1, 2023

(54) VIDEO ANALYSIS USING A DEEP FUSION REASONING ENGINE (DFRE)

(71) Applicant: Cisco Technology, Inc., San Jose, CA (US)

(72) Inventors: Hugo Latapie, Long Beach, CA (US); Enzo Fenoglio, Issy-les-Moulineaux (FR); David Delano Ward, Somerset, WI (US); Guillaume Sauvage De Saint Marc, Sevres (FR); Carole Gridley, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/860,962

(22) Filed: Jul. 8, 2022

(65) Prior Publication Data

US 2022/0351521 A1 Nov. 3, 2022

Related U.S. Application Data

(63) Continuation of application No. 16/708,648, filed on Dec. 10, 2019, now Pat. No. 11,386,667.

(Continued)

(51) Int. Cl.
*G06V 20/52* (2022.01)
*H04N 7/18* (2006.01)
(Continued)

(52) U.S. Cl.
CPC ......... *G06V 20/52* (2022.01); *G06Q 30/0625* (2013.01); *G06T 7/11* (2017.01);
(Continued)

(58) Field of Classification Search
CPC ... G06T 7/11; G06T 7/20; G06T 2207/10016; G06T 2207/20084; G06T 2207/30232;
(Continued)

(56) References Cited

U.S. PATENT DOCUMENTS 8,786,702 B2 7/2014 Cobb et al.
10,198,636 B2 2/2019 Eaton et al.
(Continued)

OTHER PUBLICATIONS

Potapov et al. "Semantic image retrieval by uniting deep neural networks and cognitive architectures." Artificial General Intelligence: 11th International Conference, AGI 2018, Prague, Czech Republic, Aug. 22-25, 2018, Proceedings 11. Springer International Publishing, 2018. (Year: 2018).*

(Continued)

*Primary Examiner* — Katrina R Fujita
(74) *Attorney, Agent, or Firm* — Behmke Innovation Group LLC; James M. Behmke; Jonathon P. Western

(57) ABSTRACT

In one embodiment, a video analysis service receives video data captured by one or more cameras at a particular location. The service applies a neural network-based model to portions of the video data, to identify objects within the video data. The service maps outputs of the neural network-based model to symbols using a conceptual space. The outputs of the model comprise the identified objects. The service applies a symbolic reasoning engine to the symbols, to generate an alert. The service sends the alert to a user interface in conjunction with the video data.

20 Claims, 16 Drawing Sheets

Related U.S. Application Data

(60) Provisional application No. 62/883,345, filed on Aug. 6, 2019.

(51) Int. Cl.

| | |
|---|---|
| *G06T 7/11* | (2017.01) |
| *G06T 7/20* | (2017.01) |
| *G08B 5/22* | (2006.01) |
| *G06Q 30/0601* | (2023.01) |
| *G06V 20/40* | (2022.01) |
| *G06V 40/10* | (2022.01) |

(52) U.S. Cl.
CPC ............... *G06T 7/20* (2013.01); *G06V 20/46* (2022.01); *G06V 40/10* (2022.01); *G08B 5/22* (2013.01); *H04N 7/181* (2013.01); *G06T 2207/10016* (2013.01); *G06T 2207/20084* (2013.01); *G06T 2207/30232* (2013.01); *G06V 2201/08* (2022.01)

(58) Field of Classification Search
CPC ........ G06V 20/46; G06V 20/52; G06V 20/54; G06V 40/10; G06V 2201/08; G06Q 30/0625; G08B 5/22; H04N 7/181
See application file for complete search history.

(56) References Cited

U.S. PATENT DOCUMENTS

| | | | |
|---|---|---|---|
| 10,887,197 | B2 | 1/2021 | Fenoglio et al. |
| 10,965,516 | B2 | 3/2021 | Fenoglio et al. |
| 2004/0249809 | A1 | 12/2004 | Ramani |
| 2010/0278425 | A1 | 11/2010 | Takemoto |
| 2011/0052000 | A1 | 3/2011 | Cobb |
| 2016/0021181 | A1 | 1/2016 | Ianakiev et al. |
| 2017/0132498 | A1 | 5/2017 | Cohen |
| 2018/0089542 | A1 | 3/2018 | Stoop |
| 2018/0204111 | A1 | 7/2018 | Zadeh et al. |
| 2019/0156189 | A1 | 5/2019 | Howard |
| 2019/0258671 | A1 | 8/2019 | Bou |
| 2019/0306011 | A1 | 10/2019 | Fenoglio et al. |
| 2020/0005225 | A1 | 1/2020 | Chaubard |
| 2021/0027471 | A1 | 1/2021 | Cohen |
| 2021/0042532 | A1 | 2/2021 | Latapie et al. |
| 2021/0174155 | A1 | 6/2021 | Smith et al. |
| 2021/0279615 | A1 | 9/2021 | Latapie et al. |
| 2021/0390423 | A1 | 12/2021 | Latapie et al. |

OTHER PUBLICATIONS

Agrawal, et al., "VQA: Visual Question Answering", Proceedings of the IEEE International Conference on Computer Vision (ICCV), 2015, 25 pages, arXiv:1505.00468v7 [cs.CL].

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

Gärdenfors, Peter, "Conceptual Spaces: The Geometry of Thought", 2000, 398 pages, MIT Press.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Kiryati, et al., "A probabilistic Hough transform", Pattern Recognition. 24(4), 1991, pp. 303-316, The Pattern Recognition Society.

Korzybski, Alfred, "Manhood of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

(56) References Cited

OTHER PUBLICATIONS

Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.
Li, et al., "Concept learning via granular computing: A cognitive viewpoint", Information Sciences 298 (2015), Published Dec. 2014, pp. 447-467, Elsevier Inc.
Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.
Ma, et al., "Granular computing and Dual Galois Connection", Information Sciences, 177(23), 2007, pp. 5365-5377, Elsevier Inc.
Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Scarselli, et al., "The Graph Neural Network Model", IEEE Transactions on Neural Networks (vol. 20, Issue: 1, Jan. 2009), pp. 61-80, IEEE.
Searle, John R., "The Rediscovery of the Mind", 1992, 104 pages, MIT Press.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "CODAM: A neural network model of consciousness", Neural Networks 20 (2007), pp. 983-992, Elsevier Ltd.
Taylor, J. G., "William James on Consciousness Beyond the Margin", 1996, 231 pages, Princeton University Press.
Thórisson, et al., "Cumulative Learning", Artificial General Intelligence—12th International Conference, AGI 2019, Proceedings, pp. 198-208, Springer.
Thórisson, Kristinn R., "A New Constructivist AI: From Manual Methods to Self-Constructive Systems", Chapter 9, Apr. 2012, pp. 147-174, Atlantis Press Book.
Thórisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, Pei, "Rigid Flexibility—The Logic of Intelligence", Draft for Comment, Feb. 8, 2004, 329 pages, mindspring.com.
Wang, et al. "Self in NARS, an AGI System", vol. 5, Article 20, Mar. 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Heirarchies of Concepts", I. Rival (Ed.), Ordered Sets, 1982, pp. 314-339.
Yao, et al., "A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.
Zhou, et al., "Graph neural networks: A review of methods and applications", AI Open, 2020, pp. 57-81, Elsevier B.V.
Zhu, et al., "Describing Unseen Videos via Multi-modal Cooperative Dialog Agents" Computer Vision—ECCV 2020, 17 pages, Lecture Notes in Computer Science, vol. 12368. Springer.
Nizar Elleuch et al., "A fuzzy ontology—Based framework for reasoning in visual video content analysis and indexing", researchgate.net, Aug. 2011, pp. 1-9.
Jordi Bieger et al., "Requirements for General Intelligence: A Case Study in Trustworthy Cumulative Learning for Air Traffic Control", International Joint Conference on Artificial Intelligence, at Stockholm, Sweden, Jul. 2018, 11 pages.
Chris Nicholson, "Artificial Intelligence (AI) vs. Machine Learning vs. Deep Learning", Skymind, https://skymind.ai/wiki/ai-vs-machine-learning-vs-deep-learning, printed Oct. 9, 2019, 6 pages.
Pei Wang et al., "Reasoning in Non-Axiomatic Logic: A Case Study in Medical Diagnosis", ResearchGate, 2011, 11 pages.
"Syllogism", online: https://en.wikipedia.org/w/index.php?title=Syllogism&oldid=878220548, dated Jan. 13, 2019, printed Feb. 8, 2019, 10 pages, Wikimedia Foundation, Inc.
Modayil, Joseph Varughese, "Robot developmental learning of an object ontology grounded in sensorimotor experience", Diss 2007.
Gardenfors et al., "Using conceptual spaces to model actions and events", Journal of semantics 29.4 (2012): 487-519.

\* cited by examiner

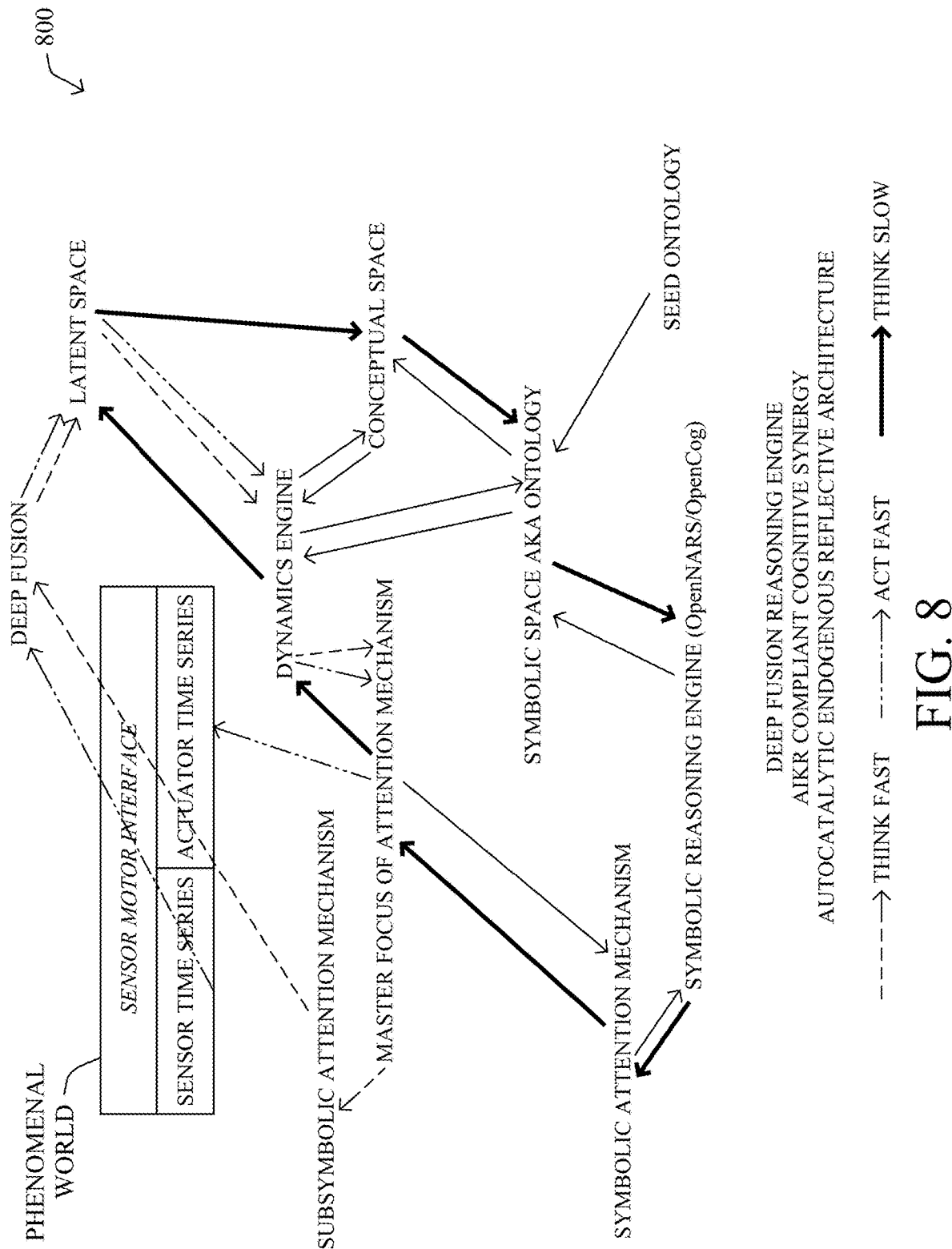

VIDEO ANALYSIS USING A DEEP FUSION REASONING ENGINE (DFRE)

RELATED APPLICATION

This application is a continuation of U.S. patent application Ser. No. 16/708,648, filed on Dec. 10, 2019, and claims priority to U.S. Provisional Patent Application No. 62/883,345, filed on Aug. 6, 2019, both entitled "VIDEO ANALYSIS USING A DEEP FUSION REASONING ENGINE (DFRE)" by Latapie et al., the entire contents of which are incorporated by reference herein.

TECHNICAL FIELD

The present disclosure relates generally to computer networks, and, more particularly, to video analysis using a deep fusion reasoning engine (DFRE).

BACKGROUND

Extending intelligence to video surveillance systems presents a myriad of potential use cases. For example, in the case of retail, one of the core requirements of all brick and mortar establishments is to continually keep store shelves stocked. The natural consequences of an unstocked or under-stocked shelf include poor customer experiences, loss of sales, and even potentially loss of customers. Thus, extending the often, pre-existing surveillance infrastructure of a retail establishment to also identify unstocked or under-stocked shelves can be of great value.

Another example of extending intelligence to video surveillance systems is found in the case of smart cities. For example, extending intelligence to the video feed(s) for an intersection could help to identify potential hazards (e.g., a car parked in a bike lane, a jaywalker, etc.) and improvements (e.g., deploying a cross walk at a location at which many people tend to jaywalk). Likewise, surveillance systems can also be extended to help detect crime and terroristic threats, helping to improve the safety of the area under surveillance (e.g., a train station, an airport, etc.).

To date, video analysis of this nature has been difficult to configure, exhibits high error rates, and is not robust enough to achieve satisfactory results. In addition, the results of applying a typical deep learning-based classifier to a video feed are often not explainable.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example graph of the interactions of the components of a DFRE.

DESCRIPTION OF EXAMPLE EMBODIMENTS

Overview

Figure 1A:
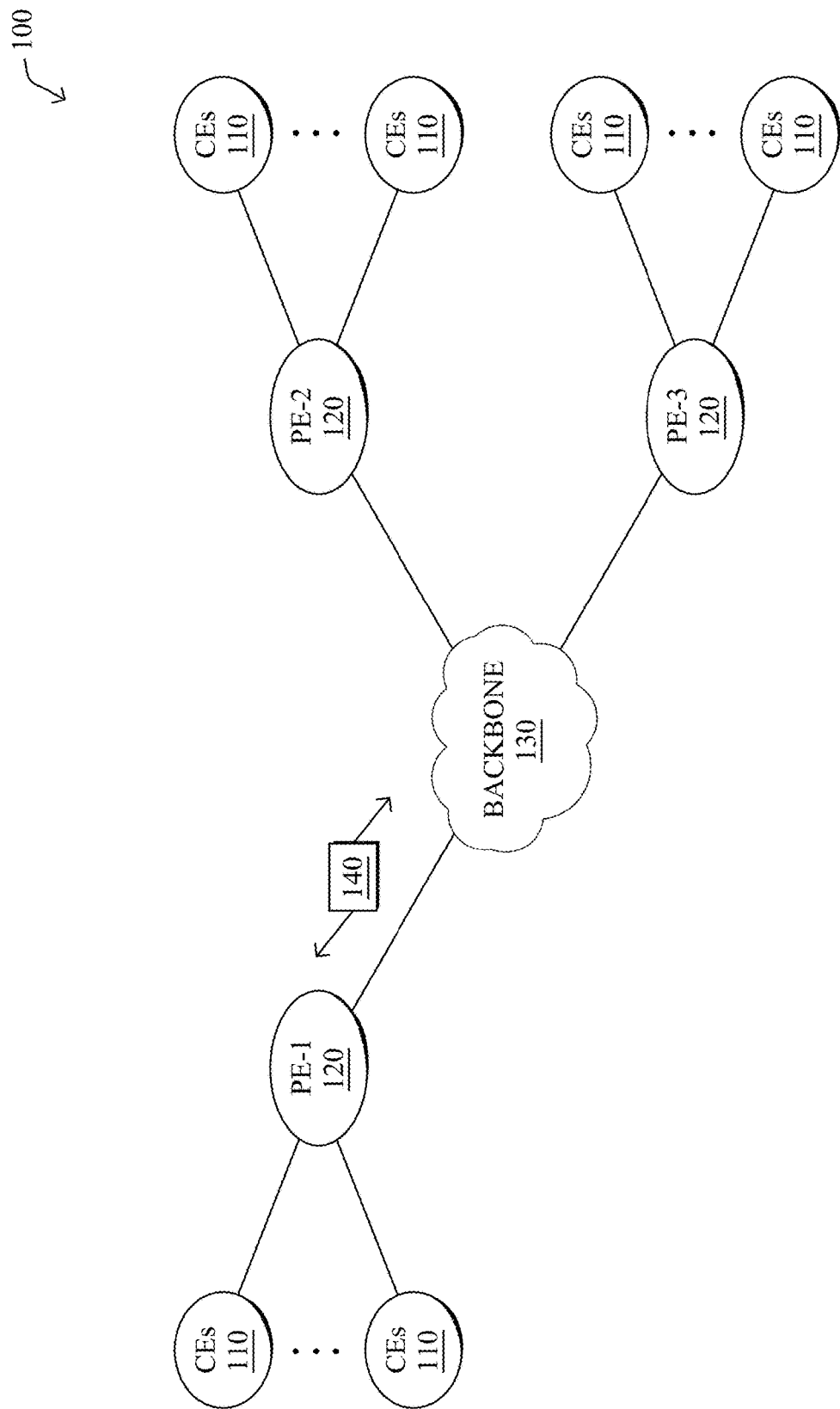
FIGS. 1A-1B illustrate an example computer network.

According to one or more embodiments of the disclosure, a video analysis service receives video data captured by one or more cameras at a particular location. The service applies a neural network-based model to portions of the video data, to identify objects within the video data. The service maps outputs of the neural network-based model to symbols using a conceptual space. The outputs of the model comprise the identified objects. The service applies a symbolic reasoning engine to the symbols, to generate an alert. The service sends the alert to a user interface in conjunction with the video data.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
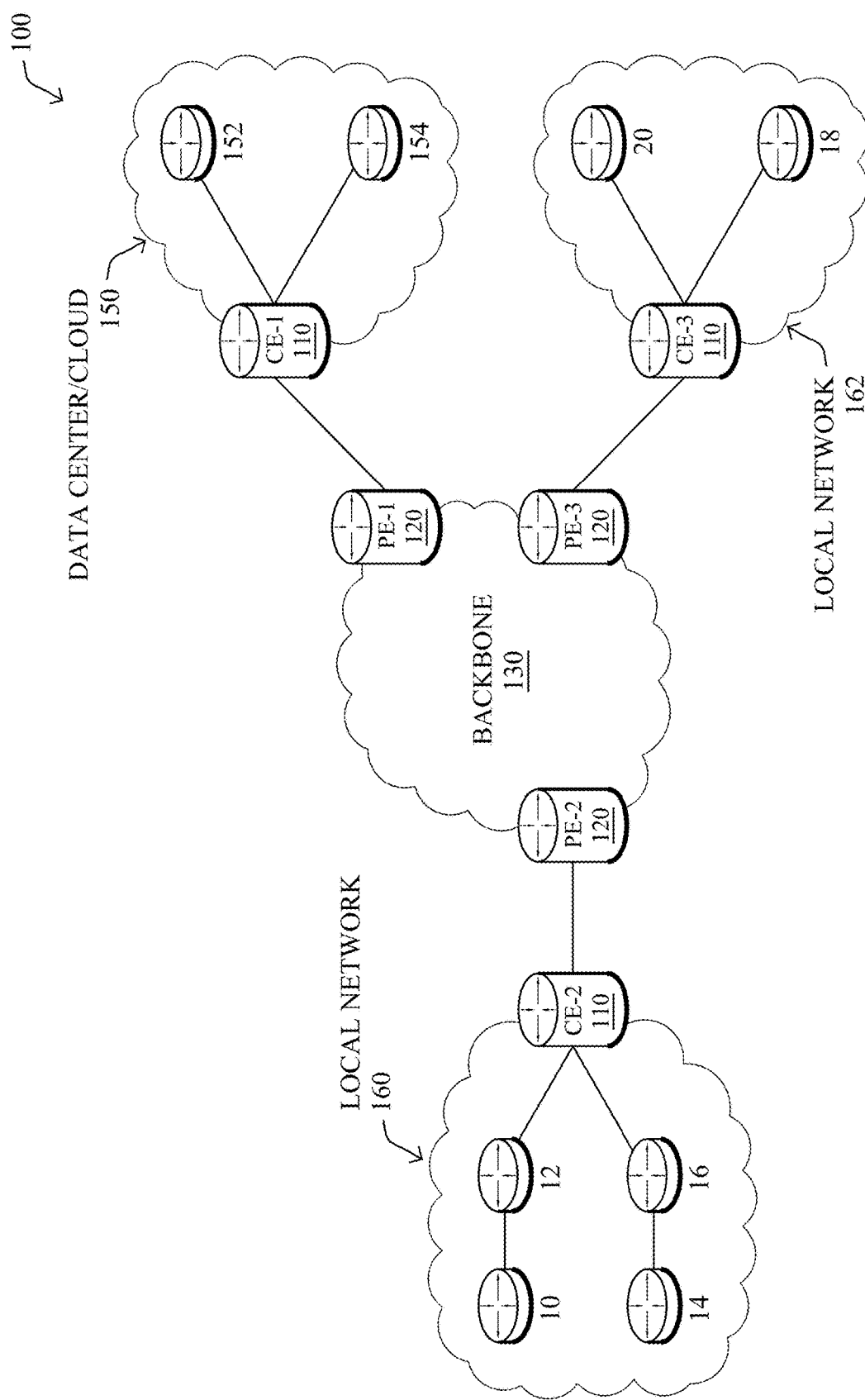

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
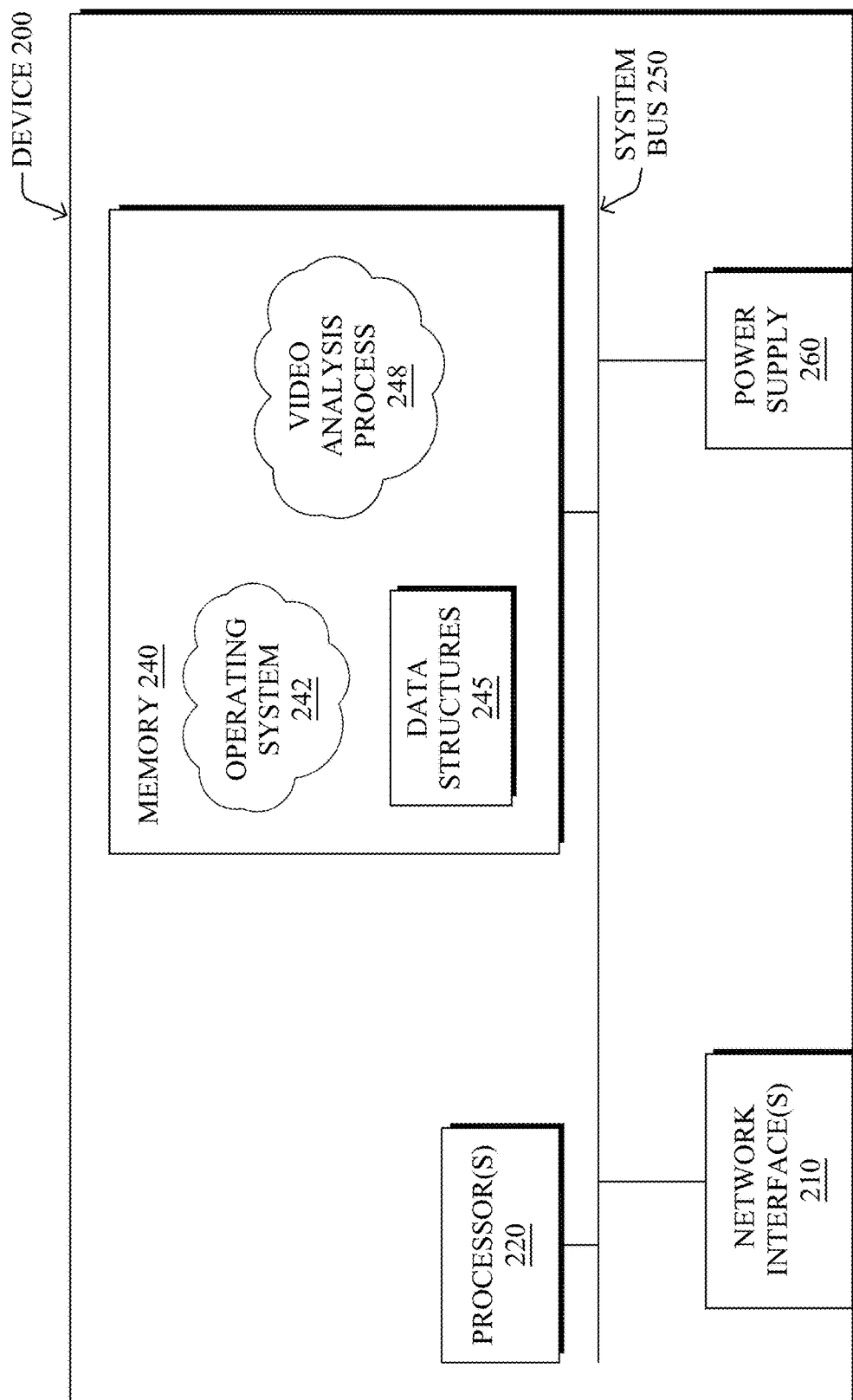
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a video analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Video analysis process 248 includes computer executable instructions that, when executed by processor(s) 220, cause device 200 to provide a video analysis service to a network. In various embodiments, video analysis process 248 may utilize machine learning techniques, in whole or in part, to perform its video analysis functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, video analysis process 248 may employ one or more supervised, unsupervised, or self-supervised machine learning models. Generally, supervised learning entails the use of a training large set of data, as noted above, that is used to train the model to apply labels to the input data. For example, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that video analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, video analysis process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
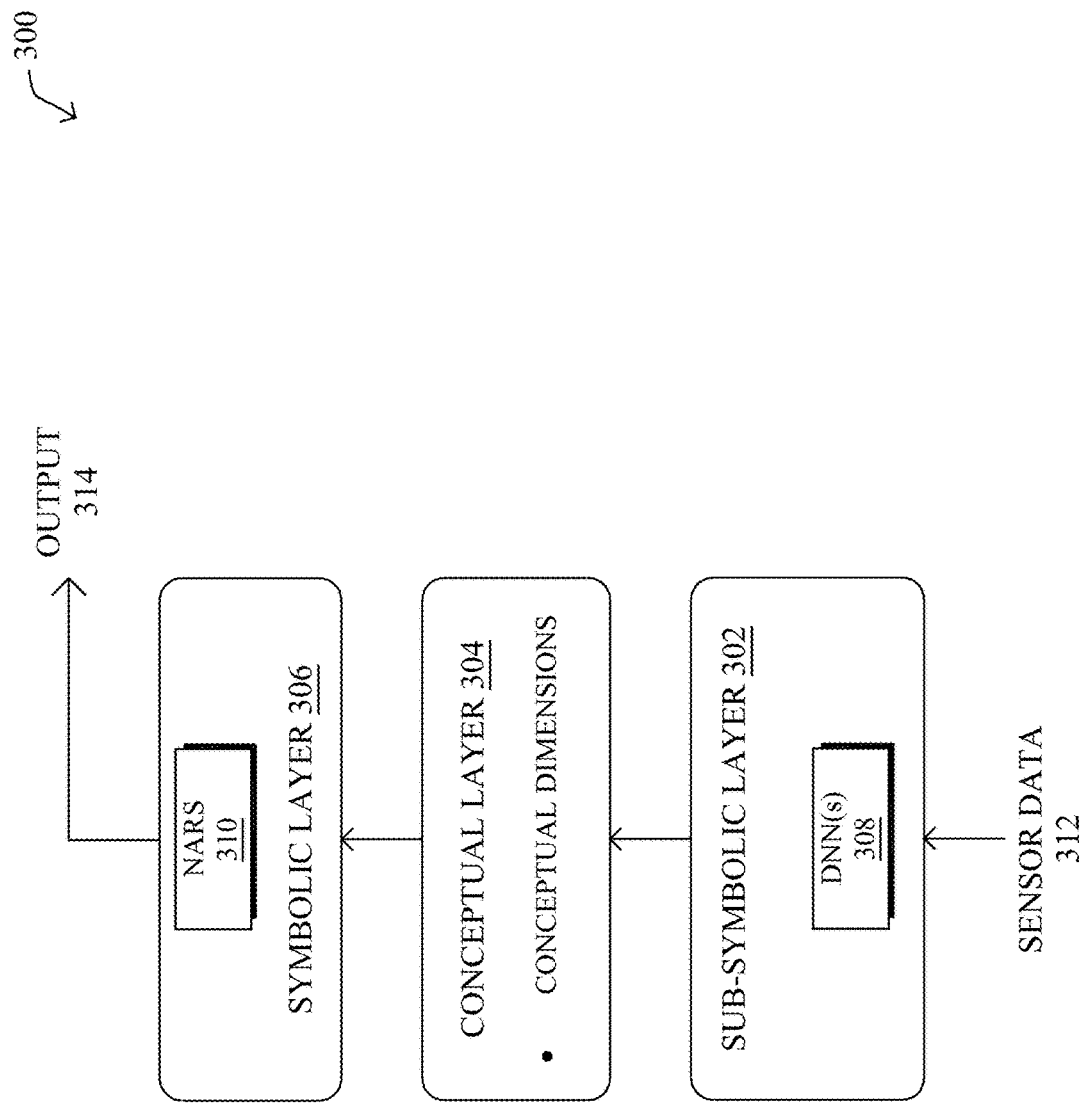
FIG. 3 illustrates an example layer hierarchy for a deep fusion reasoning engine (DFRE)

According to various embodiments, FIG. 3 illustrates an example layer hierarchy 300 for a deep fusion reasoning engine (DFRE). For example, video analysis process 248 shown in FIG. 2 may execute a DFRE to analyze video data, such as video feeds/streams from any number of video cameras.

At the lowest layer of hierarchy 300 is sub-symbolic layer 302 that processes the sensor data 312 collected from the network. For example, sensor data 312 may include video feed/stream data from any number of cameras located throughout a location. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the DFRE, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoners (NARs) generally differ from more traditional axiomatic reasoners in that the former applies a truth value to each statement, based on the amount of evidence available and observations retrieved, while the latter relies on axioms that are treated as a baseline of truth from which inferences and conclusions can be made.

Video Analysis Using a Deep Fusion Reasoning Engine (DFRE)

The techniques herein introduce a deep fusion reasoning engine (DFRE)-based architecture for assessing video feeds/streams using a hybrid neuro-symbolic system. By leveraging both deep learning and symbolic reasoning to not only identify patterns in video data, such as recognizing or tracking objects, but also to make inferences about the video data, so as to alert a user to conditions and situations present in the video data. For example, in the case of retail, the video analysis service may assess the stocking conditions of items on a shelf, to alert a user when an item is out of stock.

Illustratively, the techniques described herein may be performed by hardware, software, and/or firmware, such as in accordance with the video analysis process 248, which may include computer executable instructions executed by the processor 220 (or independent processor of interfaces 210), to perform functions relating to the techniques described herein.

Specifically, in various embodiments, a video analysis service receives video data captured by one or more cameras at a particular location. The service applies a neural network-based model to portions of the video data, to identify objects within the video data. The service maps outputs of the neural network-based model to symbols using a conceptual space. The outputs of the model comprise the identified objects. The service applies a symbolic reasoning engine to the symbols, to generate an alert. The service sends the alert to a user interface in conjunction with the video data.

Figure 4A:
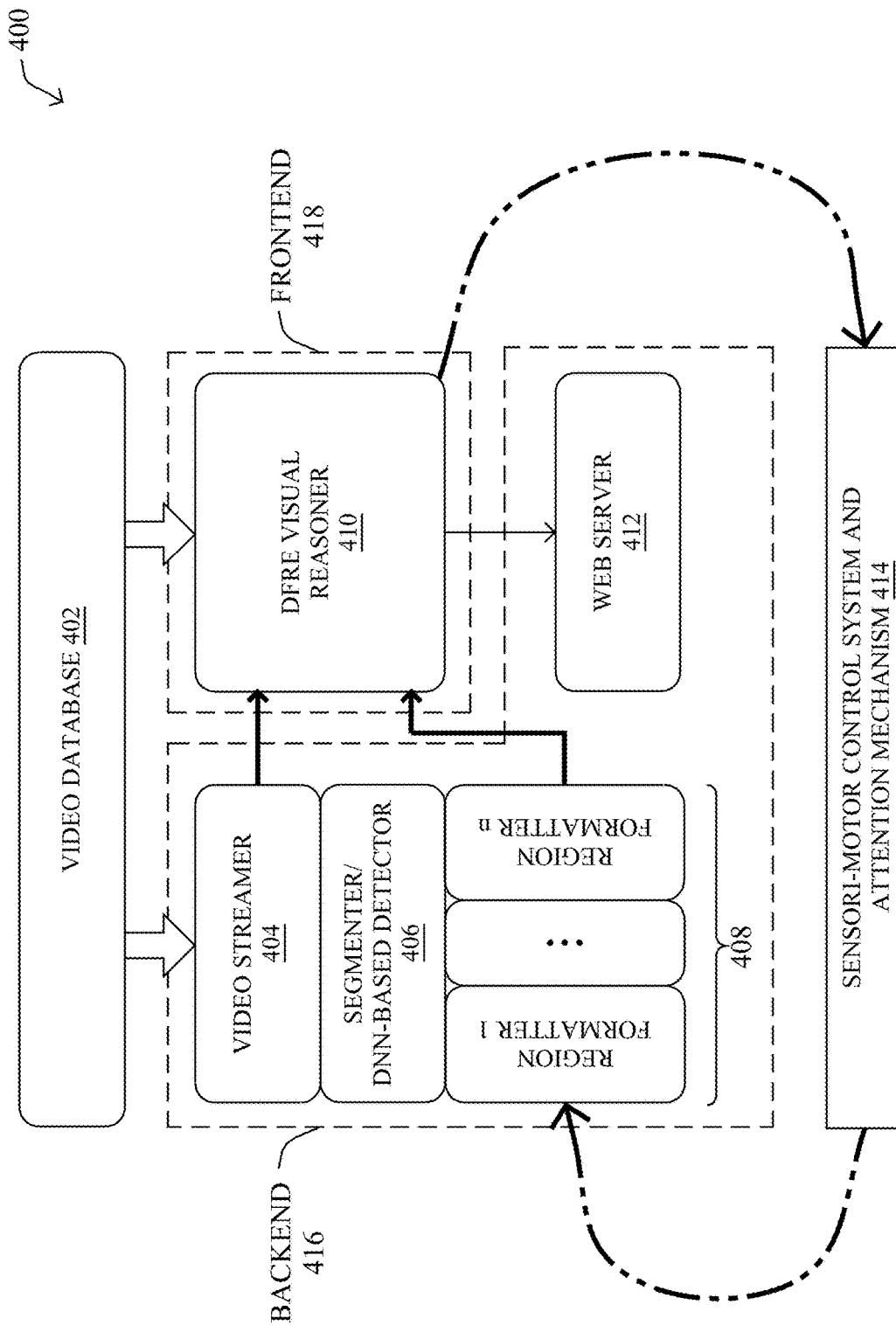
FIGS. 4A-4B illustrate example DFRE architectures.

Operationally, as noted above, a DFRE represents an evolution over both deep learning and symbolic reasoning by allowing both to interoperate with one another using a conceptual layer. FIG. 4A illustrates an example DFRE architecture 400 for performing video analysis. More specifically, video analysis process 248 may be implemented using DFRE architecture, to analyze the video feeds/streams from any number of cameras and across any number of different locations. Further, DFRE architecture 400 may be implemented in a distributed manner or implemented as its own stand-alone service, either as part of the local network under observation or as a remote service. In addition, the functionalities of the components of architecture 400 may be combined, omitted, or implemented as part of other processes, as desired.

In general, DFRE architecture 400 represents the first functioning neuro-symbolic system that merges the power of deep learning at the sub-symbolic layer with the power of symbolic reasoning at the symbolic layer. This leads to the following benefits over current 'AI' systems:
 An intelligent system which is able to solve general video analysis problems under the assumption of insufficient knowledge and resources (AIKR)
 Seed ontology based self-supervised and active learning
 Experienced based learning by reasoning
 Vastly richer knowledge representation than ML/DL/rules engines/programming languages
 True data fusion across higher levels of abstraction (sub-symbolic/symbolic) Ability to handle one-shot learning for low probability of occurrence events or tail events
 Explainable outputs
 Ability to go beyond statistical learning limitations with causal modeling
 Efficient resource utilization and can run on low power edge CPU's More specifically, in the proposed general DFRE architecture 400, a video database 402 may be populated with raw video frames captured by any number of cameras located in a particular place. Such video data may then be analyzed by a deep learning backend 416, or processed on-line using in-memory data storage frameworks, to prepare the sub-symbolic input data to be processed by a symbolic reasoner, DFRE visual reasoner 410, at the frontend 418 of architecture 400.

In particular, when a generic description is needed for a frame in video database 402, backend 416 of DFRE architecture 400 will first divide the video frame(s) into different portions. In some embodiments, backend 416 may include a video streamer 404 capable of streaming the video data according to any number of streaming protocols. For example, video streamer 404 may support any or all of the following streaming protocols:
 Dynamic Adaptive Streaming over HTTP (DASH)
 HTTP Live Streaming (HLS)
 Real Time Streaming Protocol (RTSP)
 etc.

In turn, a segmenter/DNN-based detector 406 may apply one or more machine learning models, such as a DNN-based model, to the streamed video data from video streamer 404, to identify classes/objects present in different portions of the video data. In some embodiments, detector 406 may do so by segmenting the video data into regions described by regionlets, using n-number of region formatters 408. Such regionlets may represent segmented regions of hierarchical/nested attributes for known or unknown classes/objects present within different portions of a video frame. For example, segmenter/DNN-based detector 406 may leverage its machine learning model to determine that a milk jug is present in the top left corner of the video frames.

Figure 4B:
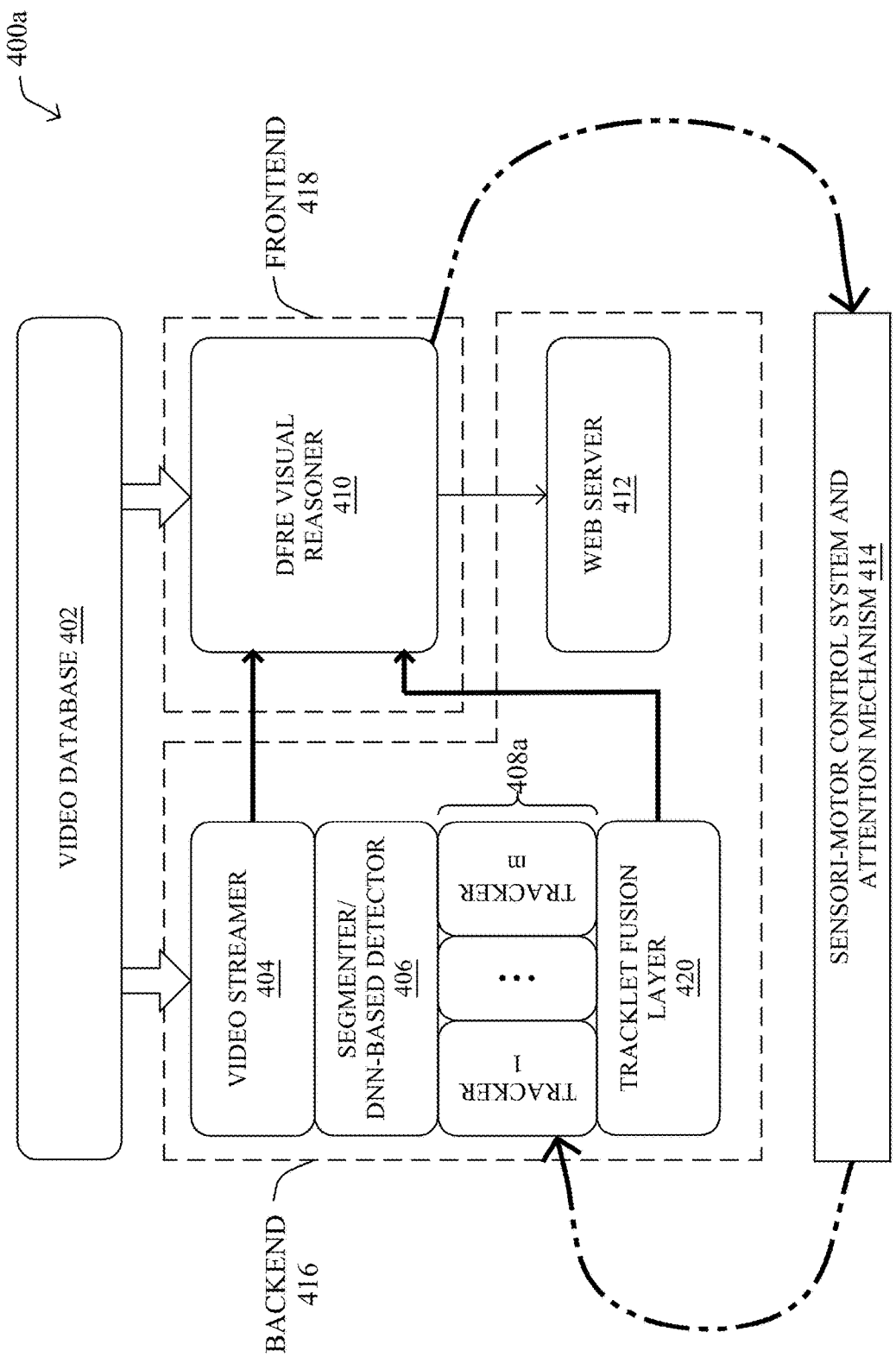

In an alternate or supplemental implementation, as shown in architecture 400a in FIG. 4B, segmenter/DNN-based detector 406 may also assess tracklets present in the video data, i.e., segments of dynamic trajectories for the various classes/objects. To do so, backend 416 may also include m-number of trackers 408a, as well as a tracklet fusion layer 420. Such tracklet analysis allows backend 416 to also perform spatio-temporal analysis on the video data by tracking specific objects found in the video data. For example, in the case of a video feed of a street, segmenter/ DNN-based detector 406 may identify and track a moving vehicle over time across a number of different frames from the video feed data from video streamer 404.

Example systems that may be suitable to implement segmenter/DNN-based detector 406 include YOLOv3, MobileNet, RetinaNet, and the like, to detect classes/objects for tracklets, and DeepMask, Path Aggregation Network (PANet), etc., to discover various regions within a segmentation mask for regionlets of a given video frame. For tracklet generation and fusion, Multiclass multi-object tracker (MC-MOT) has proven to be suitable, during testing.

The components of backend 416 may operate in conjunction with one another to provide frontend 418 with the outputs of the DNN model(s) for processing by DFRE visual reasoner 410. More specifically, and in accordance with the DFRE architecture 300 described previously, DFRE visual reasoner 410 may use a conceptual layer/space to map the output to symbols for analysis by a symbolic reasoner. In turn, DFRE visual reasoner 410 may make use symbolic reasoning to make inferences about the video data and, in turn, send alerts to a user interface. For example, DFRE visual reasoner 410 may send an alert to web server 412 for display in conjunction with the video data (e.g., as an overlay on the video frames).

Figure 5:
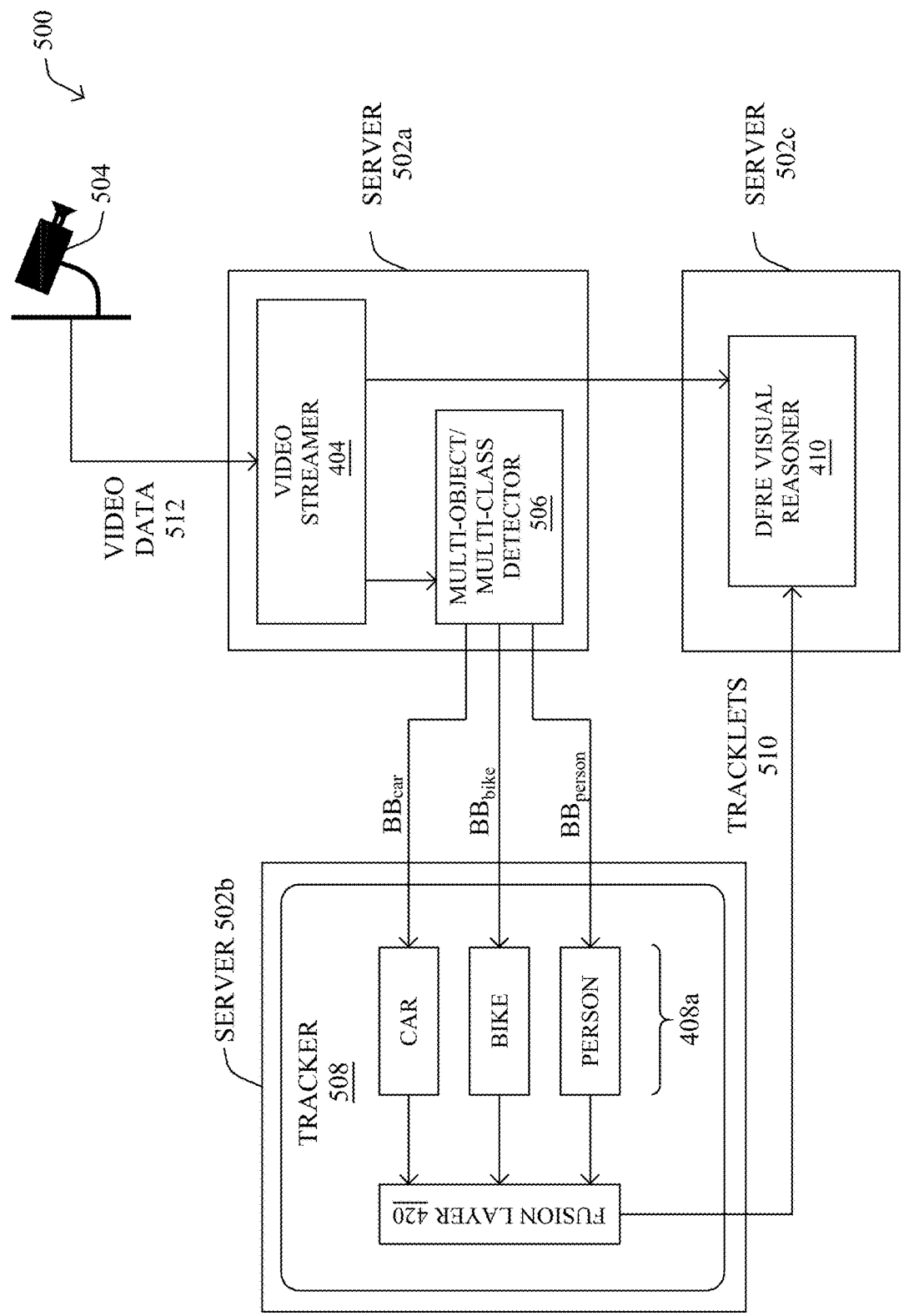
FIG. 5 illustrates an example network architecture for providing a video analysis service.

FIG. 5 illustrates an example network architecture 500 for providing a video analysis service, according to various embodiments. As shown, architecture 500 may include any number of servers 502, such as 502a-502c, which execute various components of DFRE architecture 400 described previously, to analyze video data 512 captured by any number of cameras 504. For example, server 502 may execute video streamer 404, while the other components of backend 416 may be implemented in a distributed manner across servers 502a-502b. In addition, server 502c may execute DFRE visual reasoner 410.

To illustrate an example of tracklet processing, the backend 416 of DFRE architecture 400/400a may comprise a multi-object/multi-class detector 506, such as YOLO (You Only Look Once), which is able to detect multiple objects within a video stream/feed. In other words, multi-object/ multi-class detector 506 may comprise a trained, deep learning (e.g., neural network)-based model configured to detect certain types of objects within the video data.

Architecture 500 may further include a tracker 508, which tracks the movement of the specific types of objects detected by detector 506 within the video stream/feed. For example, consider the case of deployed cameras 504 within a smart city. In such a case, as shown, tracker 508 may include trackers 408a that are configured to track the movement of specific types/classes of objects such as a car, bike, or person over time and across frames of the video data, as identified by detector 506. In turn, a fusion layer 420 of tracker 508 may fuse the detected objects into tracklets 510 for processing by DFRE visual reasoner 410. For example, fusion layer 420 may fuse different views of the same object (e.g., a particular car) from different cameras 504 into a single tracklet 510 for further analysis by DFRE visual reasoner 410.

Figure 6:
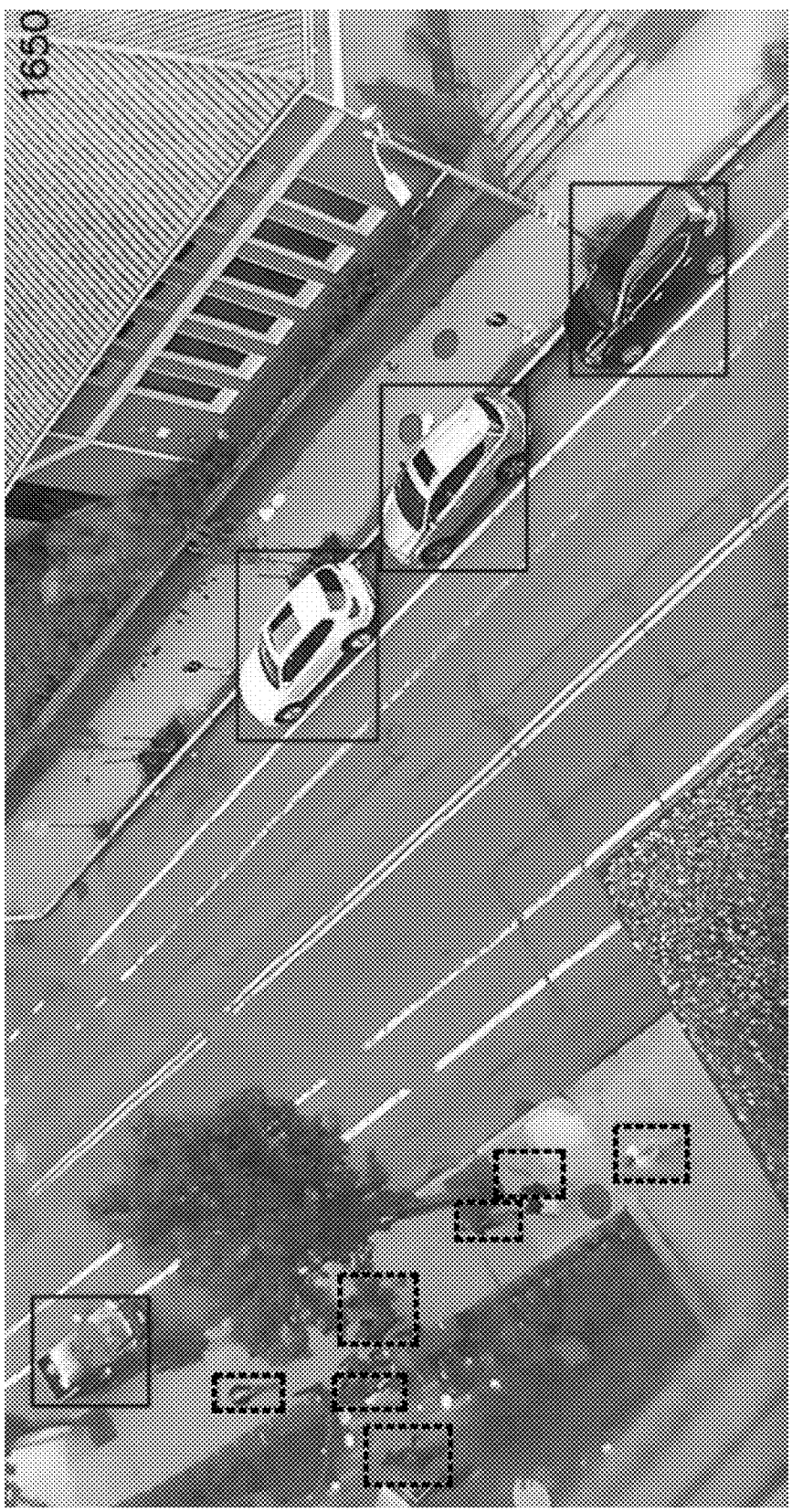
FIG. 6 illustrates an example video stream/feed.

FIG. 6 illustrates an example of the application of DFRE architecture 400/400a to a video stream/feed 600 of a street. More specifically, a prototype of DFRE architecture 400/ 400a was constructed to include an object detector 506 that was trained to identify and distinguish the various cars and people depicted within video data, such as stream/feed 600. Such object detection and tracking can be achieved, in some embodiments, by training a convolutional neural network (CNN)-based classifier to identify the predefined object classes, such as people, cars, etc. and tracking using, for example, Kalman filtering and/or Hungarian algorithms, to track their movements over time. In further embodiments, tracking was also achieved during preliminary testing using computer vision (CV) blob tracking, although the CNN-based tracking by detection, and similar approaches, yielded better results.

As noted above, tracklets represent a more specialized case for the identification and tracking of known classes/ objects within a video stream/feed by the DFRE architecture. However, in the more general case, as shown previously in FIG. 4A, the sub-symbolic backend 416 could also rely on the analysis of regionlets, particularly in the case of classes/objects that are not initially known. In general, regionlets may be formed by segmenter/DNN-based detector 406 segmenting a given frame of a video stream/feed into various regions with a segmentation mask via any or all of the following:

A semantic or instance segmenter, such as a DeepMask, FastMask, Fully Convolutional Network (FCN), ParseNet, Path Aggregation Network (PANet) Pyramid Scene Parsing Network (PSPNet), etc.

A region formatter for nested regionlets generation and fusion, which learns attraction field representation for robust line segment detection and uses segmented Bezier approximation or the like.

Figure 7A:
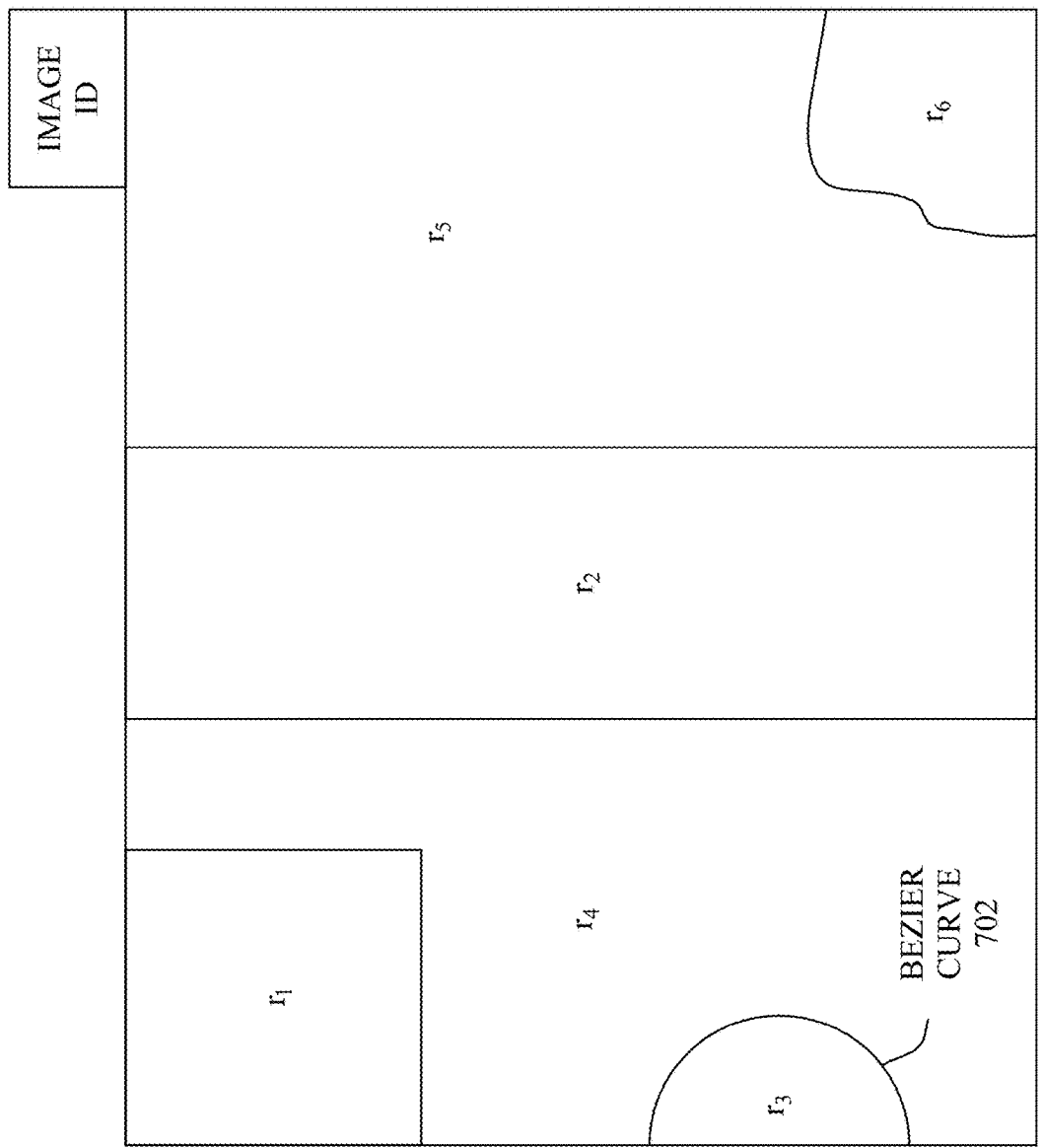
FIGS. 7A-7C illustrate examples of regionlets.
Figure 7B:
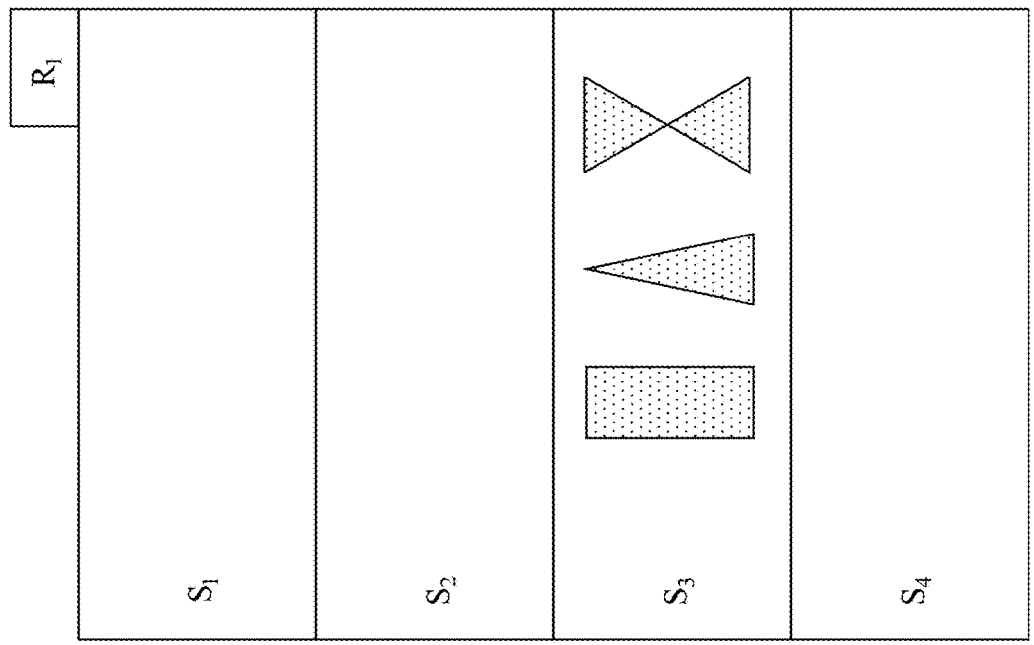
Figure 7C:
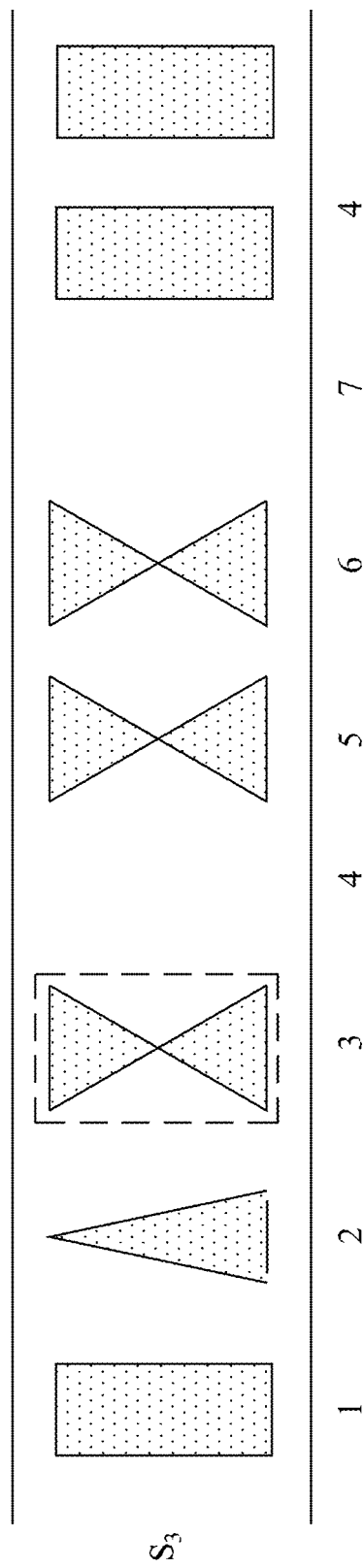

FIGS. 7A-7C illustrate examples of the formation of nested regionlets, in various embodiments. As shown in FIG. 7A, assume that a given video stream/feed includes frame 700, which has an associated image identifier, Image ID. In such a case, backend 416 of the DFRE architecture 400/400a may segment image frame 700 into different regions $r_1$-$r_6$ using Bezier curves or the like. For example, region $r_3$ may be defined within frame 700, by Bezier curve 702.

FIG. 7B illustrates an example of the application of this approach to a frame 710 depicting a series of shelves S in a retail store, with each shelf housing any number of different objects, such as jugs, boxes, etc. In turn, as shown in FIG. 7C, backend 416 of the DFRE architecture 400/400a can output a description of the regionlets that also denotes where the various objects are found and other features, such as gaps on the shelves, in a suitable format. For example, in one embodiment, the output of this analysis can be stored in JavaScript Object Notation (JSON) for input to the visual reasoner 410 of the frontend 418 of the DFRE architecture 400/400a.

By way of example, each shelf S can be represented by a regionlet using a recursive JSON Schema in JSON form using the following format:

$S_x$: {definitions:{shelf:{properties:{$L_i$: {obj,x,y}}, ref:#/definitions/shelf}}} where $L_i$ is a shelf partition, "object" is the class/label of the object detected at that partition, and x, y are its coordinates. Thus, the entire frame can be represented in JSON form for consumption by visual reasoner 410 by concatenating the representations of the various shelves depicted in the frame.

In various embodiments, the frontend 416 of the DFRE architecture 400/400a could rely on tracklets, regionlets, or both. For example, in one implementation, the DFRE could use tracklets to identify known classes/object types found within the video and regionlets to identify and learn other types of objects over time. For example, assume that the DFRE architecture includes classifiers that have been pre-trained to identify milk and juice containers, but have not been trained to identify blocks of cheese. In such a case, the regionlet analysis of the DFRE could learn the contours of the blocks of cheese over time, to associate the concept of 'cheese' with these objects.

Referring again to FIGS. 4A-4B, linking the sub-symbolic latent space from backend 416 the symbolic space (e.g., an ontology) used by the visual reasoner 410 at the frontend 418 of DFRE architecture 400/400a is an intermediate conceptual space, according to various embodiments. By translating the sub-symbolic raw data (e.g., JSON data) from backend 416 into a symbolic representation with the help of an ontology, a reasoning engine 410, such as openNARS or openCOG can then be applied, to make inferences regarding the video data. This allows DFRE visual reasoner 410 to learn general descriptions of object types in a semantically grounded way. For example, in the case of retail, reasoner 410 could leverage a sensory-motor control system and attention mechanism 414, to learn what a 'jar' is by interacting with it, in some embodiments, as detailed further below. Of course, in other embodiments, this can also be achieved manually by holding a jar in front of the camera and using image stitching photogrammetric methods, as needed.

In further embodiments, the sub-symbolic/backend 416 of DFRE architecture 400/400a may further include any or all of the following:
Lower level features from deep neural networks trained on image net and other large image datasets.
    E.g., using the initial few layers that contain abstract edges, color patches, and higher-level parts but explicitly not including the final classification layer
Optical flow and other movement sensors analogous to what is now known to exist in the retina.
Change detectors (edges, temporal, . . . ) leveraging spiking neural network architectures (neuromorphic vision).

In other words, the neuro-symbolic approach introduced herein can leverage a wide range of sub-symbolic processing approaches, in various embodiments.

FIG. 8 illustrates an example graph 800 of the interactions of the various components of the DFRE architecture 400/400a. As shown previously in FIGS. 4A-4B, DFRE architecture 400/400a may apply deep fusion to the input sensor data/video, to form a latent space. In turn, DFRE visual reasoner 410 can map the latent space to a symbolic space, also known as an 'ontology,' through the use of a conceptual space. In doing so, this allows a symbolic reasoning engine of reasoner 410, such as OpenNARS or OpenCog, to apply symbolic reasoning to the underlying video data for purpose of making inferences about the video.

For example, in the case of smart city cameras, these inferences could help to identify any or all of the following:
A person jaywalking
A person in a bike lane
A potential collision between two cars
A potential collision between a bike and a car
A potential collision between a person and a car
Etc.

In a further example, in the case of retail, these inferences could help to identify any or all of the following conditions:
An out-of-stock item
An item that is almost out of inventory
Unused portions of a shelf
Etc.

Such information can be used, in some embodiments, to drive alerts (e.g., via a webserver 412 or other interface mechanism). For example, in the case of the reasoner 410 reasoning that a particular brand of milk is out of stock on the shelf, webserver 412 could send an alert to a worker, to replenish the stock on the shelf.

Figure 9A:
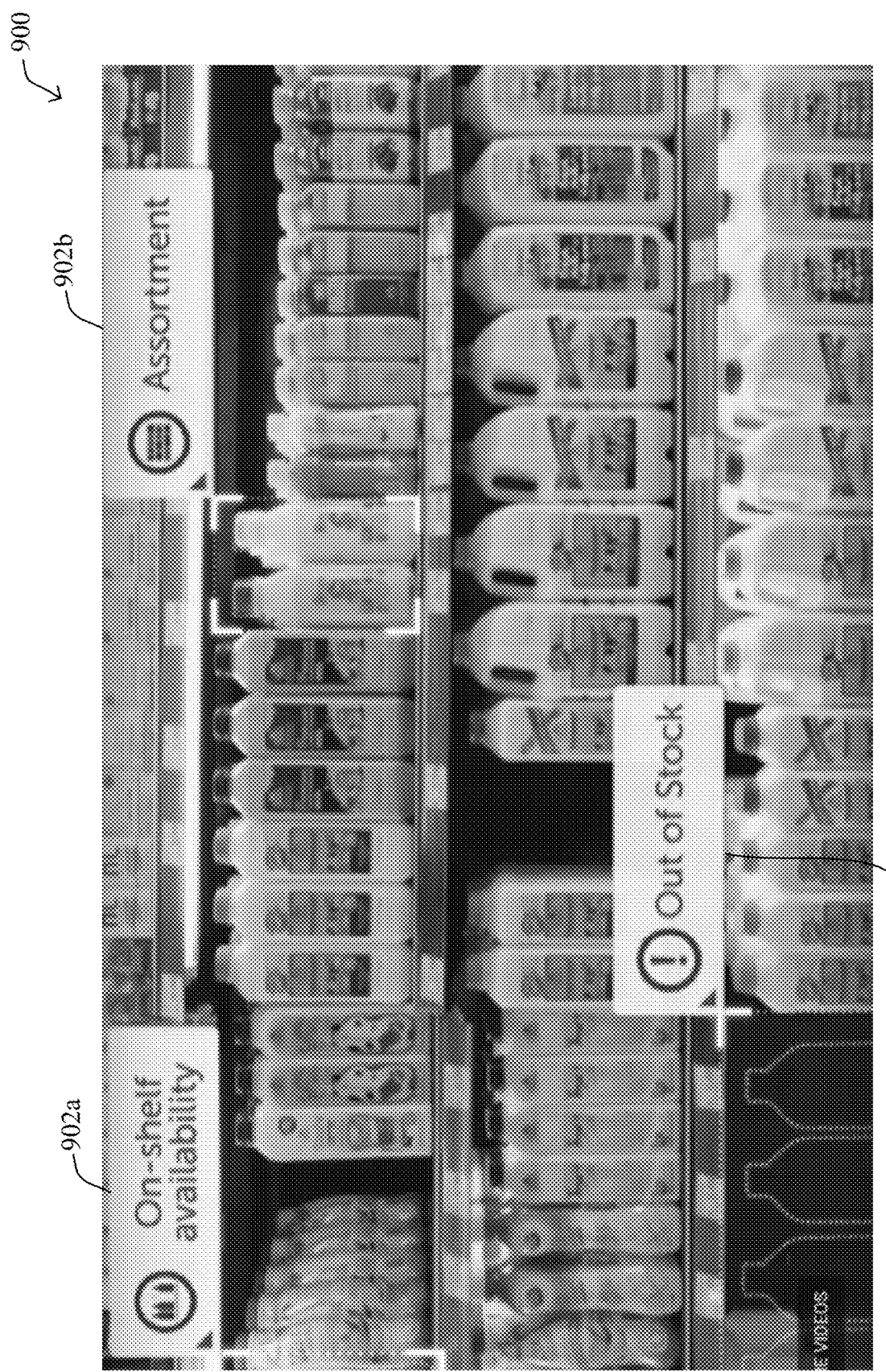
FIGS. 9A-9B illustrate examples of the analysis of video using a DFRE.

FIG. 9A illustrates an example video frame 900 that has been augmented with alerts 902. More specifically, alerts 902a-902c may take the form of overlays presented in conjunction with frames of the video data. In the case of retail shelves, different object types can be identified and, in turn, alerts 902a-902c overlaid on video frame 900 regarding the inferred availability of the different items/object types. For example, alert 902c may indicate that one quart containers of milk are out of stock.

Figure 9B:

In a similar manner, FIG. 9B illustrates an example video frame 910 assessed using a prototype video analysis service that implements DFRE architecture 400/400a. As shown, different objects such as people/pedestrians and vehicles were first identified. Then, based on the symbolic reasoning of the reasoning engine, an inference was made that a particular person in frame 910 is jaywalking. In turn, the prototype generated alert 912 as an overlay for frame 910, for presentation to a user via a user interface (e.g., a display). Other forms of alerts are also contemplated herein, such as flashing a light, alerting the police, etc.

Figure 10:
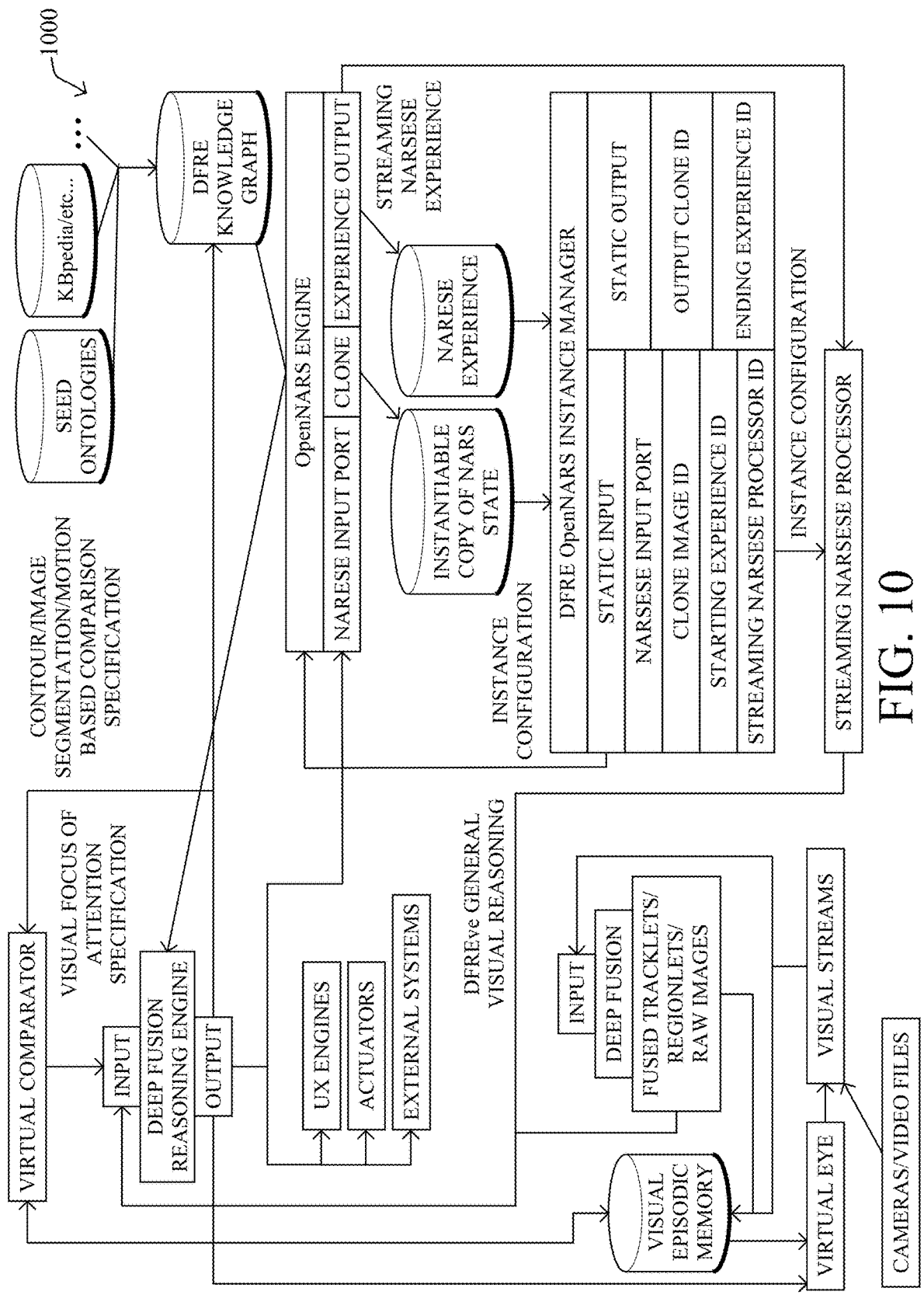
FIG. 10 illustrates an example DFRE implementation.

FIG. 10 illustrates an example prototype 1000 that implements DFRE architecture 400/400a using OpenNARs for its symbolic reasoner, in one embodiment. Note, however, that other types of reasoners could also be used, such as open-COG or any other artificial intelligence knowledge representation-based reasoner, in further embodiments.

Referring again generally to FIGS. 4A-4B and 8, in various embodiments, the DFRE-based video analysis service may also have the ability for the symbolic space to control a sensori-motor control system and attention mechanism 414. In other words, the symbolic reasoner 410 could control, via mechanism 414, a 'virtual eye' that moves a focus of attention (FOA) region that is smaller than the full video frame under scrutiny. Left/right/top/bottom are defined in a sensory motor manner via control of the FOA. For example, left may be defined now as the new sensor streams generated when the FOA is moved to the left. This semantically grounds the concepts of not only left/right/top/ bottom, but also near/far (e.g., based on the distance or time it takes for the FOA to move from one place to the next). Positional prepositions like on/above/below etc., can also be semantically grounded in this manner.

With only a seed ontology, the DFRE visual reasoner 410 can learn new and complex real-world scenarios in self-supervised mode with no specific knowledge or calibration of the view it is receiving. For example, the seed ontology to locate shelves could cause the DFRE architecture 400/400a to scan the scene with the FOA looking for a known object class leveraging the visual comparator based on contours/outlines of the prior training. As an example, say that that a bag of coffee is detected in the middle of a frame. The seed ontology understands the concept of gravity and that structural support is required for an object to remain at a fixed location in space.

Thus, visual reasoner 410 may hypothesize that the area immediately below the detected bag is either a floor, table, product shelf or the like. Using other visual clues, the reasoner 410 can then rule out that the area is not the floor. Next, the system might move the FOA, using mechanism 414, to the right of the object and detect what appears to be an unknown object and corresponding rotations in episodic memory. The useful information that this object provides to the reasoner 410 is that the bottom of the object forms a line that could either be the boundary of a table or shelf. By scanning the FOA left and right in this manner and/or up and down, DFRE architecture 400/400a can construct a model of regions in the video frame that contain shelves, tables, display cases, etc. This nested attribute description is what is referred to above as a nested regionlet. This operation of moving from frames to regionlets can occur at any desired frequency, such as once per minute or even more, depending on the configuration of the camera(s). From an operational perspective, these regionlets allow the service to provide continuous, real-time assessment of product availability (e.g., whether there are any significant gaps in the products on a given shelf, etc.). In a further embodiment, to identify specific products, DFRE architecture 400/400a could further leverage metric space image and contour embeddings and/or optical character recognition, to read labels.

In the case of smart cities, an example seed ontology based on the Narsese language used in Open-NARS for use by reasoner 410 is presented below. As would be appreciated, this seed ontology is presented for purposes of illustrating the operation of the techniques herein. However, the techniques herein are not limited to such an ontology and other seed ontologies can be created for both the smart cities use case and for other use cases, as desired.

```
//>>>> Goals
    <anomaly --> [report]>!
//Realize through inform operation invocation
    <(&/,<{#1} --> anomaly>`dfre(inform,[#1])) =/> <anomaly --> [report]>>.
//>>>> Anomaly classes
    <jaywalking --> anomaly>.
    <blocking --> anomaly>.
    <potential_danger --> anomaly>.
    <accident --> anomaly>.
    <speeding --> anomaly>.
//>>>> Properties and relations
//Fast means DFRE dependent property of speed limit
    <(&/,<{$1} --> entity>,<(*,{$1},#region) --> in>,`dfre(fast,{$1},#region,True))
    =|> <{$1} --> [fast]>>.
//Speeding means above speed limit
    <(&/,<{$1} --> entity>,<(*,{$1},#region) -->
    in>,`dfre(speeding,{$1},#region,True)) =|> <{$1} --> [speeding]>>.
//Stopped means 0% of speed limit
    <(&/,<{$1} --> entity>,`dfre({$1},speed,#v),<#v <-> {0}>) =|> <{$1} -->
    [stopped]>>.
//Approaching means both vectors converging to the same position
    <(&/,<{$1,$2} --> entity>,`dfre(approaching,{$1},{$2},True)) =|>
    <(*,{$1},{$2}) --> approaching>>.
//Aligned with entity or region
    <`dfre(aligned,$1,$2,True) =/> <(*,$1,$2) --> aligned>>.
//Orthogonal to entity or region
    <`dfre(orthogonal,$1,$2,True) =/> <(*,$1,$2) --> orthogonal>>.
//>>>> Anomaly Detection
//Accident
    <(&/,(&|,<{$1} --> entity>,<{$1} --> [fast]>,(&|,<(*,{$1},{$3}) -->
    at>,<(*,{$2},{$3}) --> at>,<{$1,$2} --> [stopped]>)) =|>
    <{(*,{$1},{$2},{$3},collision)} --> accident>>.
//Blocked carlane
    <(&|,<{#1,#2} --> entity>,<{(*,{#1},{#2},{#location},collision)} -->
    accident>,<{#location} --> carlane>) =|> <{(*,carlane,blocked)} --> blocking>>.
//Jaywalking
    <(&|,<{$1} --> pedestrian>,<(*,{$1},carlane) --> in>) =|> <{(*,{$1},jaywalks)} -
    -> jaywalking>>.
//Potential danger
    <(&|,<{#1,$2} --> entity>,<{#1} --> [fast]>,<(*,{#1},{$2}) --> approaching>)
    =|> <{(*,{$2},fast_approached)} --> potential_danger>>.
//Speeding
    <(&|,<{$1} --> entity>,<{$1} --> [speeding]>) =|> <{(*,{$1},going_too_fast)} --
    > speeding>>.
//>>>> Regions
//Types of regions
    <(|,sidewalk,crosswalk,carlane,bikelane,intersection) --> region>.
//Finding the region the entity is in
    <(&|,<{$1} --> entity>,<$region --> region>,<(*,{$1},{#2}) --> at>,<{#2} -->
    $region>) =|> <(*,{$1},$region) --> in>>.
//Finding sidewalks
    <(&|,<{#1} --> pedestrian>,<#2 --> carlane>,<(*,{#1},#2) -->
    aligned>,<(*,{#1},{$location}) --> at>,`dfre(adjacent,{$1},#2,True)) =|>
    <{$location} --> sidewalk>>.
//Finding carlanes
    <(&|,<{#1} --> car>,<(*,{#1},{$location}) --> at>) =|> <{$location} -->
    carlane>>.
//Finding bikelanes
    <(&|,<{#1} --> bike>,<(*,{#1},{$location}) --> at>) =|> <{$location} -->
    bikelane>>.
```

```
//Finding intersections
    <(&|,<$1 --> carlane>,<$2 --> carlane>,<(*,$1,$2) --> orthogonal>) =|>
    <(&,$1,$2) --> intersection>>.
//>>>> Crosswalks
//The 4 sidewalk corners around each intersection: it's defined by two sidewalks that
cross each other
    <(&|,<$1 --> sidewalk>,<$2 --> sidewalk>,<(*,$1,$2) --> orthogonal>) =|>
    <(&,$1,$2) --> sidewalk_corner>>.
//Intersection crosswalk: There is a sidewalk corner adjacent to an (carlane-)intersection,
and a pedestrian is in a carlane walking orthogonally to it, and the carlane he is in is
adjacent to the intersection, so the region he is in is a crosswalk
    <(&|,<$1 --> sidewalk_corner>,<$2 -->
    intersection>,(^dfre,adjacent,$1,$2,True),<{$3} -->
    pedestrian>,<(*,{$3},{$region}) --> in>,<$region -->
    (|,carlane,crosswalk)>,<(*,{$3},$region) -->
    orthogonal>,(^dfre,adjacent,{$3},$2,True)) =|> <$region --> crosswalk>>.
//Finding zebra crosswalks
    <(&|,<{#1} --> pedestrian>,<#2 --> carlane>,<(*,{#1},#2) -->
    orthogonal>,<(*,{#1},{$location}) -->
    at>,^dfre(DFRE_crosswalk,{$location},True)) =|> <{$location} --> crosswalk>>.
//>>>> Extrapolation of regions
//Extrapolate regions along the vector direction (revising with less truth the further away
from origin)
    <(&|,<{$1} --> pedestrian>,<(*,{$1},sidewalk) --> in>) =|>
    ^want(^dfre(extrapolate,{$1},sidewalk))>.
    <(&|,<{$1} --> car>,<(*,{$1},carlane) --> in>) =|>
    ^want(^dfre(extrapolate,{$1},carlane))>.
    <(&|,<{$1} --> bike>,<(*,{$1},bikelane) --> in>) =|>
    ^want(^dfre(extrapolate,{$1},bikelane))>.
//>>>> Precondition-dependent speed limit modifications affecting maxSpeed
//bad preconditions lead to reduction of maxSpeed return values
    <(&|,<$1 --> region>,<#2 --> BadPrecondition>) =|>
    ^want(^dfre(reduceMaxSpeed,$1))>.
//good preconditions lead to reset of maxSpeed return values
    <(&|,<$1 --> region>,<#2 --> GoodPrecondition>) =|>
    ^want(^dfre(resetMaxSpeed,$1))>.
//Fog is a bad precondition
    <foggy --> BadPrecondition>.
//Sun is a good precondition
    <sunny --> GoodPrecondition>.
//Detected children is a bad precondition
    <children --> BadPrecondition>.
//All kinds of instances of anomalies are also bad preconditions
    <<{$1} --> anomaly> =|> <{$1} --> BadPrecondition>>.
```

Using the above seed ontology, the DFRE architecture 400/400a can identify not only objects (e.g., people, cars, bike lanes, etc.), but also anomalous conditions such as jaywalking, blocked bike lanes, and the like.

Figure 11:
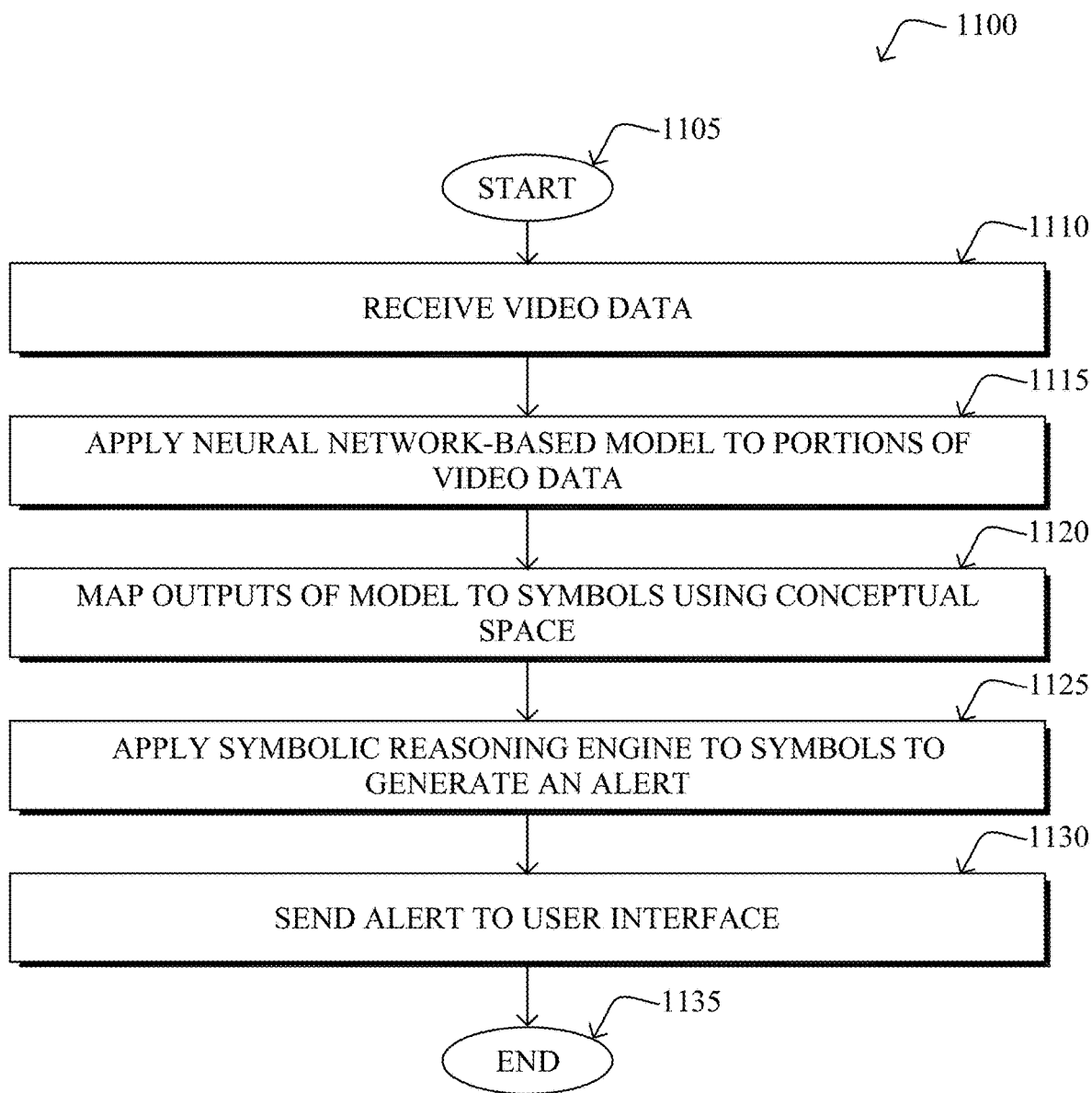
FIG. 11 illustrates an example simplified procedure for analyzing video data.

FIG. 11 illustrates an example simplified procedure 1100 for analyzing video data, according to various embodiments. In general, a video analysis service in a network, which may be provided by one or more devices (e.g., a device 200), may perform procedure 1100. As shown, procedure 1100 may start at step 1105 and continue on to step 1110 where, as described in greater detail above, the service may receive video data captured by one or more cameras at a particular location. For example, the particular location may be a retail establishment, a street, or any other desired location.

At step 1115, as detailed above, the service may apply a neural network-based model to portions of the video data, to identify objects within the video data. In various embodiments, the service may apply one or more deep learning models to portions of the video data, to identify objects within different portions of a video frame, such as a shelf, one or more items on the shelf, a pedestrian, a vehicle, or the like. In one embodiment, the service may do so in part by dividing the frame into segmented regions by applying one or more Bezier curves to the frame. This allows the model to classify/label the object(s) present within a given region. In further embodiments, the service may also leverage the use of tracklets, which track the movement of an identified object over time across multiple video frames. For example, in the case of a pedestrian, the corresponding tracklet may indicate the trajectory or other information regarding the pedestrian over time.

At step 1120, as detailed above, the service may map outputs of the model of step 1115 to symbols using a conceptual space. For example, the service may apply a seed ontology to the outputs of the neural network-based model, using the conceptual space. This allows the system to bridge the sub-symbolic data from the model to a symbolic layer that can be processed using a symbolic reasoner. Such an ontology can also be expanded by the service for a particular object/object type, for example, through the use of a sensorimotor control system. For example, the service may virtually change a focus of attention for a given region/portion of the video data, thereby allowing the service to better learn about different objects, their characteristics, and relationships.

At step 1125, the service may apply a symbolic reasoning engine to the symbols, to generate an alert, as described in greater detail above. In various embodiments, by applying the symbolic reasoning engine to the symbolic layer, the reasoner can make inferences about the video data. For example, such an alert may indicate the availability of an item on a retail shelf, a hazardous condition present in the video, etc.

At step 1130, as detailed above, the service may send the alert to a user interface in conjunction with the video data.

In one embodiment, the service may do so by providing the alert as an overlay for one or more frames of the video data. This allows the user to quickly assess the situation and respond to the alert, as needed. Procedure 1100 then ends at step 1135.

Accordingly, a DFRE-based architecture is introduced that can be used to assess video feeds/streams from any number of different locations. For example, in some aspects, the techniques herein can be used in a retail setting to assess the availability of goods on the shelves of the establishment. In further aspects, the techniques herein can be used in a smart city setting to assess a roadway, public area (e.g., a train station, a bus station, etc.), or the like.

As would be appreciated, the hybrid neuro-symbolic approach introduced herein is able to leverage symbolic reasoning to make inferences about the video data using conceptual learning, as opposed to simply pattern matching. For example, training a neural network on gallon jugs of milk will enable it to identify only gallon jugs of milk. However, by linking the sub-symbolic processing to a symbolic layer, the system can 'learn' the concept of a jug and identify other jugs of different shapes and sizes.

While there have been shown and described illustrative embodiments that provide for using a DFRE to analyze video, it is to be understood that various other adaptations and modifications may be made within the spirit and scope of the embodiments herein. For example, while certain embodiments are described herein with respect to using the DFRE to assess certain types of video (e.g., of a retail environment, etc.), the techniques herein are not limited as such and can be used generally to assess any form of video (e.g., video from a surgical procedure, video of a sporting event, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a video analysis service, video data captured by one or more cameras at a particular location;
   applying, by the video analysis service, a neural network-based model to each of a plurality of segmented regions of a frame from the video data, to identify objects within one or more of the plurality of segmented regions of the frame;
   mapping, by the video analysis service, outputs of the neural network-based model to symbols using a conceptual space that is an intermediate layer between a sub-symbolic layer and a symbolic layer, wherein the outputs of the neural network-based model comprise a symbolic representation for identification of the objects in the video data;
   applying, by the video analysis service, a symbolic reasoning engine to the symbols, to generate an alert; and
   sending, by the video analysis service, the alert to a user interface in conjunction with the video data.

2. The method as in claim 1, wherein sending the alert to the user interface in conjunction with the video data comprises:
   providing the alert as an overlay for one or more frames of the video data.

3. The method as in claim 1, wherein applying the neural network-based model comprises:
   dividing the frame from the video data into the plurality of segmented regions by applying a segmented Bezier curve approximation to the frame.

4. The method as in claim 1, wherein applying the neural network-based model comprises:
   tracking movement of an object over time across frames from the video data.

5. The method as in claim 1, wherein mapping outputs of the neural network-based model to symbols using a conceptual space comprises:
   applying a seed ontology to the outputs of the neural network-based model.

6. The method as in claim 5, further comprising:
   using a sensori-motor control system to expand the seed ontology for a particular object.

7. The method as in claim 1, wherein the objects identified in the video data comprise a shelf and one or more items on the shelf.

8. The method as in claim 7, wherein the alert is indicative of an item availability on the shelf.

9. The method as in claim 1, wherein the objects identified in the video data comprise a vehicle and a pedestrian.

10. An apparatus, comprising:
    one or more network interfaces to communicate with a network;
    a processor coupled to the one or more network interfaces and configured to execute one or more processes; and
    a memory configured to store a process that is executable by the processor, the process when executed configured to:
    receive video data captured by one or more cameras at a particular location;
    apply a neural network-based model to each of a plurality of segmented regions of a frame from the video data, to identify objects within one or more of the plurality of segmented regions of the frame;
    map outputs of the neural network-based model to symbols using a conceptual space that is an intermediate layer between a sub-symbolic layer and a symbolic layer, wherein the outputs of the neural network-based model comprise a symbolic representation for identification of the objects in the video data;
    apply a symbolic reasoning engine to the symbols, to generate an alert; and
    send the alert to a user interface in conjunction with the video data.

11. The apparatus as in claim 10, wherein the apparatus sends the alert to the user interface in conjunction with the video data by:
    providing the alert as an overlay for one or more frames of the video data.

12. The apparatus as in claim 10, wherein the apparatus applies the neural network-based model by:
    dividing the frame from the video data into the plurality of segmented regions by applying a segmented Bezier curve approximation to the frame.

13. The apparatus as in claim 10, wherein the apparatus applies the neural network-based model by:
 tracking movement of an object over time across frames from the video data.

14. The apparatus as in claim 10, wherein the apparatus maps outputs of the neural network-based model to symbols using a conceptual space comprises:
 applying a seed ontology to the outputs of the neural network-based model.

15. The apparatus as in claim 14, wherein the process when executed is further configured to:
 use a sensori-motor control system to expand the seed ontology for a particular object.

16. The apparatus as in claim 10, wherein the objects identified in the video data comprise a shelf and one or more items on the shelf.

17. The apparatus as in claim 16, wherein the alert is indicative of an item availability on the shelf.

18. The apparatus as in claim 10, wherein the objects identified in the video data comprise a vehicle and a pedestrian.

19. A tangible, non-transitory, computer-readable medium that stores program instructions that cause a video analysis service to execute a process comprising:
 receiving, at the video analysis service, video data captured by one or more cameras at a particular location;
 applying, by the video analysis service, a neural network-based model to each of a plurality of segmented regions of a frame from the video data, to identify objects within one or more of the plurality of segmented regions of the frame;
 mapping, by the video analysis service, outputs of the neural network-based model to symbols using a conceptual space that is an intermediate layer between a sub-symbolic layer and a symbolic layer, wherein the outputs of the neural network-based model comprise a symbolic representation for identification of the objects in the video data;
 applying, by the video analysis service, a symbolic reasoning engine to the symbols, to generate an alert; and
 sending, by the video analysis service, the alert to a user interface in conjunction with the video data.

20. The tangible, non-transitory, computer-readable medium as in claim 19, wherein sending the alert to the user interface in conjunction with the video data comprises:
 providing the alert as an overlay for one or more frames of the video data.

\* \* \* \* \*

UNITED STATES PATENT AND TRADEMARK OFFICE
CERTIFICATE OF CORRECTION

PATENT NO. : 11,715,304 B2
APPLICATION NO. : 17/860962
DATED : August 1, 2023
INVENTOR(S) : Hugo Latapie et al.

It is certified that error appears in the above-identified patent and that said Letters Patent is hereby corrected as shown below:

In the Specification

Column 16, Line 17, please amend as shown:
<(&/,<{#1} --> anomaly>,^dfre(inform,{#1})) =/> <anomaly --> [report]>>.

Signed and Sealed this
Fourteenth Day of November, 2023

Katherine Kelly Vidal
*Director of the United States Patent and Trademark Office*